United States Patent
Kwon

(10) Patent No.: US 6,942,383 B2
(45) Date of Patent: Sep. 13, 2005

(54) COOKING PAN

(76) Inventor: Man-Hyun Kwon, Sungwon Apt. 103-1701, 1552-19, Dadee-song, Saha-gu, Busan-city 604 755 (KR)

(*) Notice: Subject to any disclaimer, the term of this patent is extended or adjusted under 35 U.S.C. 154(b) by 0 days.

(21) Appl. No.: 10/392,049

(22) Filed: Mar. 19, 2003

(65) Prior Publication Data

US 2004/0184511 A1 Sep. 23, 2004

(51) Int. Cl.[7] .......................... G01K 5/00; G01K 13/00; G01K 1/00
(52) U.S. Cl. .................. 374/205; 374/155; 374/141; 374/208
(58) Field of Search .................. 374/141, 206, 374/207, 208, 100, 205, 155, 210, 187; 220/573.1–573.5, 752, 756; 219/440, 441

(56) References Cited

U.S. PATENT DOCUMENTS

| | | | | |
|---|---|---|---|---|
| 2,219,950 A | * | 10/1940 | Childs | 374/141 |
| 2,872,561 A | * | 2/1959 | Humphrey | 219/441 |
| 3,277,714 A | * | 10/1966 | Crandell | 374/157 |
| 3,648,887 A | * | 3/1972 | Hartley | 220/759 |
| 3,878,584 A | * | 4/1975 | Witte | 220/752 |
| 4,032,032 A | * | 6/1977 | Carroll et al. | 220/752 |
| 4,242,570 A | * | 12/1980 | Clark | 219/441 |
| 4,330,069 A | * | 5/1982 | Bauer | 220/203.18 |
| 4,509,868 A | * | 4/1985 | Ronconi et al. | 374/141 |
| 4,535,229 A | * | 8/1985 | Wolf et al. | 219/440 |
| 4,541,733 A | * | 9/1985 | Andre | 374/149 |
| 4,794,666 A | * | 1/1989 | Kim | 220/753 |
| 5,620,255 A | * | 4/1997 | Cook, III | 374/141 |
| 5,643,485 A | * | 7/1997 | Potter et al. | 219/621 |
| 6,064,042 A | * | 5/2000 | Glucksman et al. | 219/452.13 |
| 6,206,564 B1 | * | 3/2001 | Adamczewski | 374/141 |
| 6,497,174 B1 | | 12/2002 | Cacace | |
| RE37,988 E | * | 2/2003 | Uss | 99/343 |
| 6,578,469 B2 | * | 6/2003 | Sharpe | 99/342 |
| 2002/0181541 A1 | * | 12/2002 | Lee | 374/141 |
| 2003/0112846 A1 | * | 6/2003 | Murtagh | 374/149 |
| 2003/0169801 A1 | * | 9/2003 | Chilton | 374/142 |
| 2004/0149736 A1 | * | 8/2004 | Clothier | 219/627 |

FOREIGN PATENT DOCUMENTS

| | | | | | |
|---|---|---|---|---|---|
| EP | 215737 A2 | * | 3/1987 | | A47J/45/07 |
| FR | 2707471 A1 | * | 1/1995 | | A47J/45/08 |
| GB | 2111373 A | * | 7/1983 | | A47J/45/06 |
| JP | 63311130 A | * | 12/1988 | | G01K/1/14 |
| KR | 2003088406 A | * | 11/2003 | | A47J/36/34 |
| SE | 9900518 A | * | 8/2000 | | A47J/27/62 |

* cited by examiner

Primary Examiner—Gail Verbitsky
Assistant Examiner—Mirellys Jagan
(74) Attorney, Agent, or Firm—Dilworth & Barrese LLP

(57) ABSTRACT

The cooking pan in which one side of an outer circumferential face of a main body is combined with a handle through a bolt fastening has such a construction that a temperature display member is equipped with an upper face of a coupling end part combined with a guide protrusion of the main body, wherein the temperature display member is provided with a sense rod formed in one body from a lower portion of a display, the sense rod being closely inserted into a rod insertion hole of the coupling protrusion projected in one body from the main body, thereby displaying temperature transferred from the coupling protrusion so as to provide an easy cooking and the best taste of food and to prevent unnecessary consumption of fuel in cooking.

6 Claims, 3 Drawing Sheets

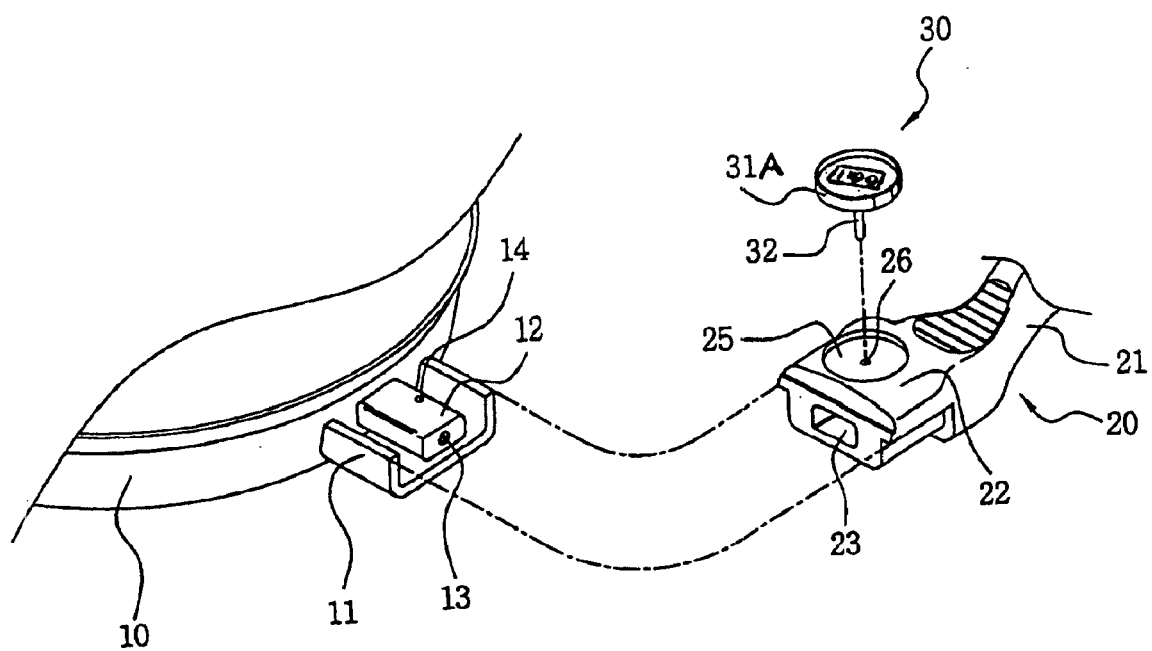

COOKING PAN

BACKGROUND OF THE INVENTION

1. Field of the Invention

The present invention relates to a cooking pan, and more particularly, to a cooking pan in which a temperature display member is assembled with a handle fastened to a main body through a bolt.

2. Description of the Related Art

A cooking utensil is generally equipped with a handle so that a user just grasps the cooking utensil.

In other words, since the cooking utensil, such as a cooking pan, is normally heated to high temperatures so as to boil the contents therein, the user can not grasp the pan directly by the hands.

Therefore, the handle is arranged at one side or both sides of the main body of the cooking pan so that the user can grasp the cooking pan more safely and simply. Typically, a frying or sauce pan has its handle formed only at one side.

Meanwhile, the cooking utensil such as a cooking pan heats the food at a constant temperature to cook the food. However, optimum cooking temperatures are unique for different sorts of food.

The temperature at which food is cooked is an important factor affecting its taste.

Furthermore, different cooking temperatures typically affect the appearance of food. The latter may be as important as the taste. Moreover, it is not unusual to decide whether the food is done based on its color, which is a function of temperature. Making a decision regarding the status of the food being cooked based on its color may eliminate the need for opening a lid, which, otherwise, may be detrimental to the taste of food. Thus controlling cooking temperatures is important.

While an experienced cook may rely on visual factors, such as boiling or color, in deciding whether the food is ready, an inexperienced cook may either undercook or overheat the food.

Further, even an experienced cook may have difficulties in checking the food's state when the lid is closed. Opening the lid prematurely, as mentioned above, may detrimentally affect the taste of food.

SUMMARY OF THE INVENTION

Therefore, an object of the present invention is to provide a cooking pan through which temperature can be definitely checked during cooking even without opening a lid so as to provide best taste of food.

Another object of the present invention is to provide a cooking pan capable of preventing a waste of cooking time and improve a fuel saving effect.

To achieve these objects, the cooking pan in which one side of an outer circumferential face of a main body is combined with a handle through a bolt fastening, has such a construction that a temperature display member is coupled with a guide protrusion of the main body. The temperature display member is provided with a sense rod coupled to and extending from a lower portion of the display member, and closely inserted into a rod insertion hole of the coupling protrusion projecting from the main body. Therefore, the temperature display member displays temperature transferred from the coupling protrusion by the sense rod.

BRIEF DESCRIPTION OF THE DRAWINGS

The above and other objects and features of the present invention will become apparent from the following description of the preferred embodiments thereof made in conjunction with the accompanying drawings, of which:

FIG. 4 is a perspective view showing main parts of a cooking pan in accordance with the present invention directed to an embodiment having a digital temperature screen.

DETAILED DESCRIPTION OF THE PREFERRED EMBODIMENTS

Hereinafter, preferred embodiments of the present invention will be described in detail with reference to the accompanied drawings.

Figure 1:
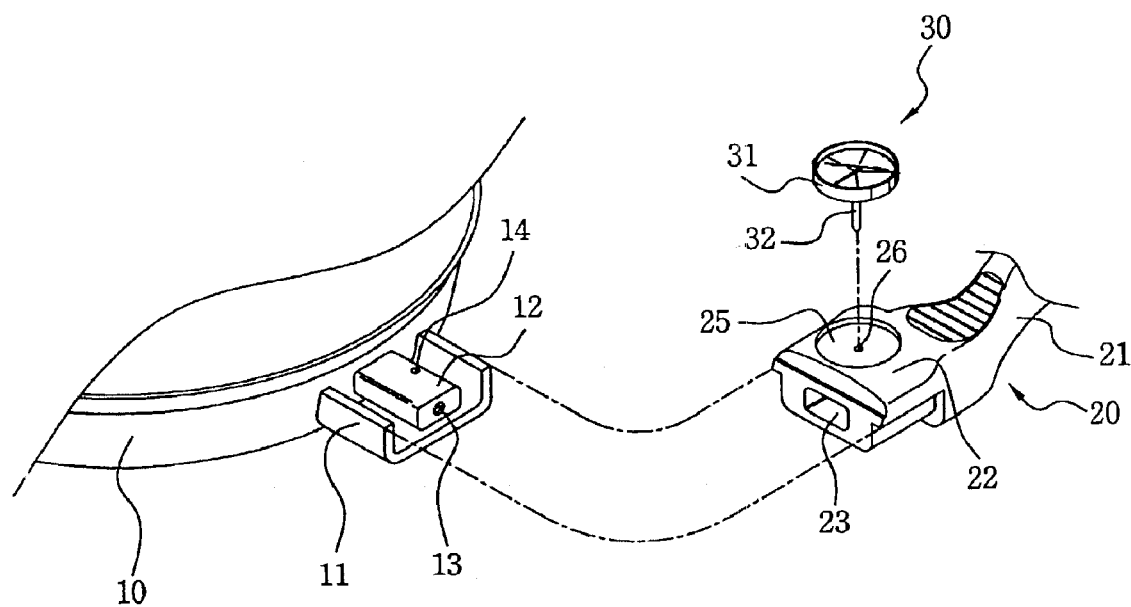
FIG. 1 is a perspective view showing main parts of a cooking pan in accordance with the present invention.

FIG. 1 is a perspective view showing disassembled main components of a cooking pan in accordance with the present invention;

Referring first to FIG. 1, the cooking pan is largely divided into a main body 10, a handle 20 and a temperature display member 30.

The main body has a downward recessed space, shaped and dimensioned to receive food therein, and is made of thermally conductive metal material.

On an outer circumferential face of the main body 10, a guide protrusion 11, formed unitarily with the main body, has a U-shaped cross-section and is projected outwards from the main body. In an inner side of the guide protrusion 11, a coupling protrusion 12, formed unitarily with the main body, is projected from an outer circumferential face of the main body 10. The coupling protrusion 12 is spaced from an inner side face of the guide protrusion 11.

An end face of the coupling protrusion 12 has a bolt insertion hole 13, and an upper portion of the coupling protrusion 12 has a vertical rod insertion hole 14 that does not cross the bolt insertion hole 13.

The handle 20 is made of material suitable for preventing a heat transfer, differently from material of the main body 10 having high heat conductivity.

The handle 20 is constructed of a grasp part 21 and a coupling end part 22. The grasp part 21 has a shape easy to be grasped by a user, and an end part of the main body side of the grasp part 21 is provided as the coupling end part 22 capable of being assembled easily simultaneously with the guide protrusion 11 and the coupling protrusion 12 of the main body 10.

Figure 2:
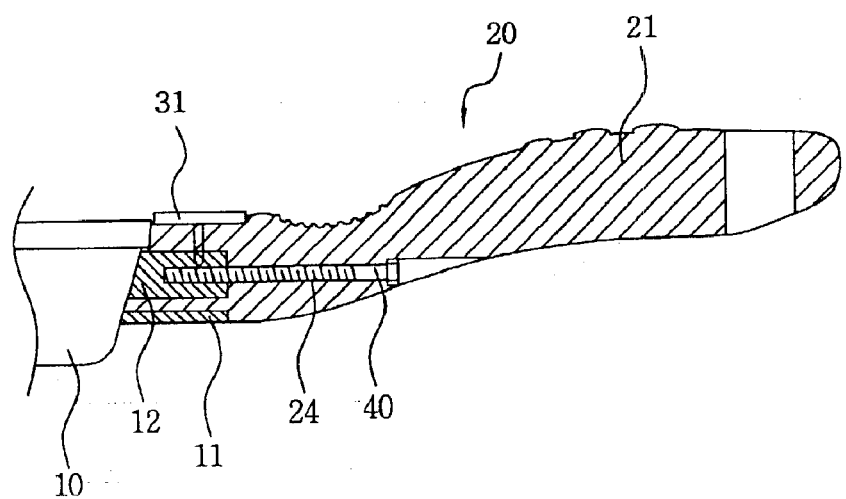
FIG. 2 is a sectional view of main parts of the present invention.

As shown in FIG. 2, in the coupling end part 22, an outer circumferential face of a lower portion thereof is recessed by the thickness of the guide protrusion 11 so as to be matched with the guide protrusion 11 of the main body 10 through an insertion operation. An end portion of the coupling end part 22 has an insertion hole 23 into which the coupling protrusion 12 of the main body 10 can horizontally be inserted. This insertion hole 23 has a through-hole 24 extended to and piercing backward through the grasp part 21, the insertion hole 23 being positioned on the same horizontal line as a bolt insertion hole 13 formed in the coupling protrusion 12.

Also, the coupling end part 22 has an insertion flute 25 downwardly recessed with a constant diameter from an upper face thereof. In the center of the insertion flute 25, a rod insertion hole 26 is formed on the same vertical line as the rod insertion hole 14 of the coupling protrusion 12 of the main body 10 so that it does not cross the through-hole 24.

Meanwhile, the temperature display member 30 is constructed of a display 31 whose upper part is formed with a constant diameter and thickness in a circular shape and of a sense rod 32 that is downwardly extended from a low portion of the display 31, the display 31 being formed with the sense rod 32 in one body.

An upper face of the display 31 is made of transparent material, and the interior of the display 31 has a temperature display plate 31a and an indicative needle 31b. The sense rod 32 is made of internally vacant metal material and the interior thereof has bimetal (not shown) that becomes elastic according to temperature transferred to the rod material.

This bimetal is connected to the indicative needle 31b of the display 31 to rotate the indicative needle 31b according to a thermal transformation extent of the bimetal so as to check temperature indicated by the indicative needle 31b through a transparent cover from an upper side.

Figure 3:
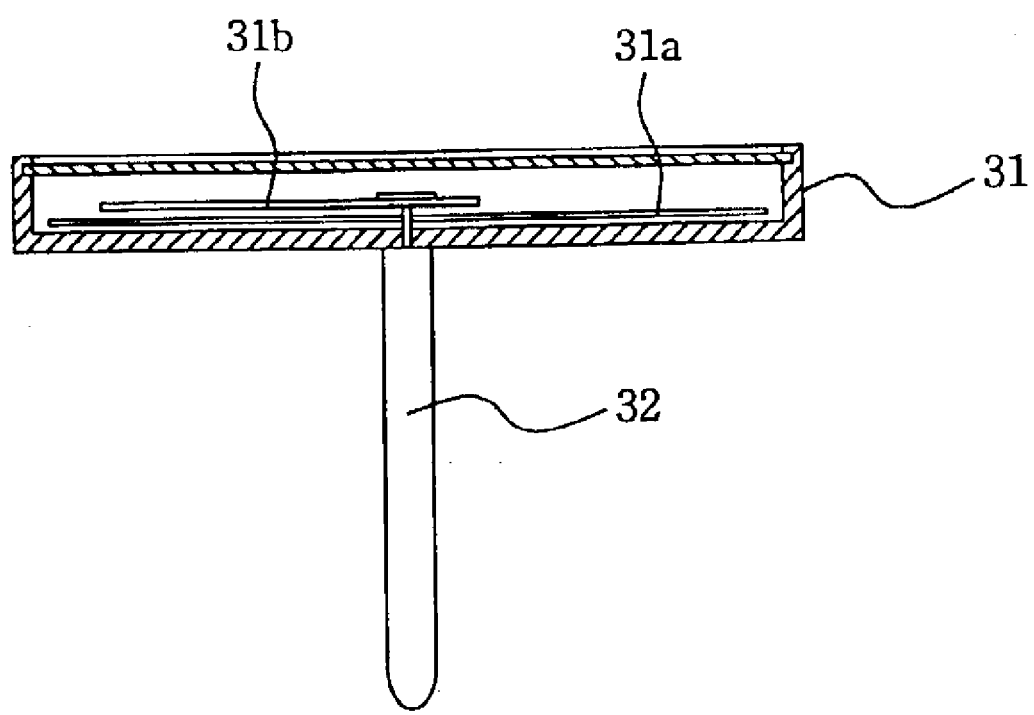
FIG. 3 is a side sectional view of a temperature display member of the present invention.

Especially, the temperature display member 30 can be constructed of the display 31 represented by a digital screen 31c (FIG. 4). That is, the present invention can be constructed so that temperature displayed through the bimetal thermally transformed by heating temperature transferred through the sense rod 32 is represented with digits. Note that the temperature display member 30 may display the temperature by using either a needle (see 31b, FIG. 3) or a digital display (see 31c, FIG. 4).

An assembly and operations of the present invention will be described as follows.

As shown in the drawings, first the guide protrusion 11 of the main body 10 is combined with the handle 20, and then the handle 20 is simply combined with the temperature display member 30.

That is to say, the coupling protrusion 12 formed in an inner side of the guide protrusion 11 of the main body 10 is closely inserted into the insertion hole 23 formed in an end portion of the coupling end part 22 of the handle 20. The lower part's outer circumferential face of the coupling end part 22 of the handle 20 is surrounded by the guide protrusion 11 under a solid assembly state.

Herewith, in a lower part of the handle 20, a bolt 40 is inserted into the bolt insertion hole 13 through the through-hole 24, from the rear of the coupling end part 22, thereby the handle 20 is strongly fixed to the main body 10.

After combining the handle 20 with the main body 10, the temperature display member 30 is stably mounted in the insertion flute 25 formed in an upper part of the coupling end part 22 of the handle 20.

In other words, the display 31 of the temperature display member 30 is stably mounted in the insertion flute 25, and the sense rod 32 of the temperature display member 30 is inserted into the rod insertion hole 26 formed in a center of the insertion flute 25. Herewith, the sense rod 32 is inserted through the rod insertion hole 26 to the rod insertion hole 14 of the coupling protrusion 12 so as to closely be in face-contact with the coupling protrusion 12.

Particularly, the temperature display member 30 can be constructed to be strongly fixed to the coupling end part 22 of the handle 20 or to be combined with each other through a simple assembly so as to be separable therebetween.

As above-described, in the present invention, the handle 20 is fixed to the main body 10 and is used by assembling the temperature display member 30 with the coupling end part 22.

When the main body 10 is heated with given temperature in cooking food, heating temperature of the main body 10 is intact transferred to the coupling protrusion 12 projected in one side direction. At this time, heat is transferred through the sense rod 32 to the temperature display member 30 that was already face-contacted with the coupling protrusion 12.

The temperature transferred to the sense rod 32 thermally transforms the bimetal, thus the indicative needle 31b of the display 31 connected to the bimetal moves to indicate current cooking temperature so as to visually, easily check a cooking state by a cooking person.

Thus, temperature can be checked any time during a cooking process to prepare the tasty food. In addition, even a beginner can cook food easily, thus a convenience for cooking can be provided at maximum.

Additionally, there is no need for an unnecessarily long heating time associated with excessive consumption of fuel.

As described above, in the present invention, the temperature display member 30 is simply combined with the handle 20 that is combined with the main body 10. In this temperature display member 30, the sense rod 32 is inserted into the rod insertion hole 14 of the coupling protrusion 12 for combining the handle 20 with the main body 10, and heating temperature of the main body 10 can be sensed through the sense rod 32 under such a simplified construction. Particularly, taste of cooked food can be provided best.

In addition, even a beginner can easily deal the inventive cooking pan and can have a confidence for a food cooking.

Further, a cooking time can be shortened at maximum and unnecessary consumption of fuel can be prevented.

Finally, although the present invention was described in detail above in connection with the preferred embodiments thereof, the scope of the invention is not so limited. Rather, various changes and modifications of the preferred embodiments, as will become apparent to those of ordinary skill in the art, are seen to be within the true spirit and scope of the invention as defined by the appended claims.

What is claimed is:

1. A cooking pan comprising:
    a body;
    an elongated thermo-conductive protrusion fixed to said body extending outwards from the body along a longitudinal axis;
    a handle detachably coupled to the elongated thermo-conductive protrusion; and
    a temperature display member comprising a thermo-conductive sense rod made of an elongated hollow case of a thermally conductive material, a bimetal mounted in the case, and a display coupled to the rod, wherein the thermo-conductive sense rod is coupled to the elongated thermo-conductive protrusion and projects perpendicular to the longitudinal axis through the handle.

2. The cooking pan of claim 1, wherein the display is a digital display.

3. A cooking pan in which one side of an outer circumferential face of a main body is combined with a handle through a bolt, said pan comprising:
    an elongated guide protrusion fixedly attached to and projecting outwards from an outer side of the main body along a longitudinal axis and having an inner surface;
    a coupling protrusion projecting from the outer side of the main body and spaced adjacent to the inner surface of the elongated guide protrusion;

a coupling end part which forms one end portion of the handle and is combinable with the coupling protrusion of the main body; and a temperature display member comprising a display having an indicative needle, a temperature sense rod made of an elongated hollow case of a thermally conductive material coupled to the display, and a bimetal mounted in the sense rod and connected to the needle, wherein the sense rod of the temperature display extends perpendicular to the longitudinal axis and is closely inserted into a rod insertion hole of the coupling protrusion to contact the coupling protrusion and transfer heat from the coupling protrusion to the bimetal to move the needle and display the temperature of the coupling protrusion.

4. The cooking pan of claim 3, wherein the coupling end part of the handle has an insertion hole into which the coupling protrusion is closely inserted.

5. The cooking pan of claim 3, wherein the sense rod extends downwards from a lower portion of the display, and the bimetal is made of a material that is capable of becoming elastic in response to the heat conveyed by the sense rod from the coupling protrusion.

6. The cooking pan of claim 5, wherein the display comprises a housing having a cover made of a transparent material, and containing a temperature display plate and the indicative needle in an interior thereof.

* * * * *